Dec. 10, 1935.　　　　　P. AHACICH　　　　　2,023,658
DOUGHNUT MECHANISM AND THE LIKE
Filed Dec. 2, 1931　　　3 Sheets-Sheet 1
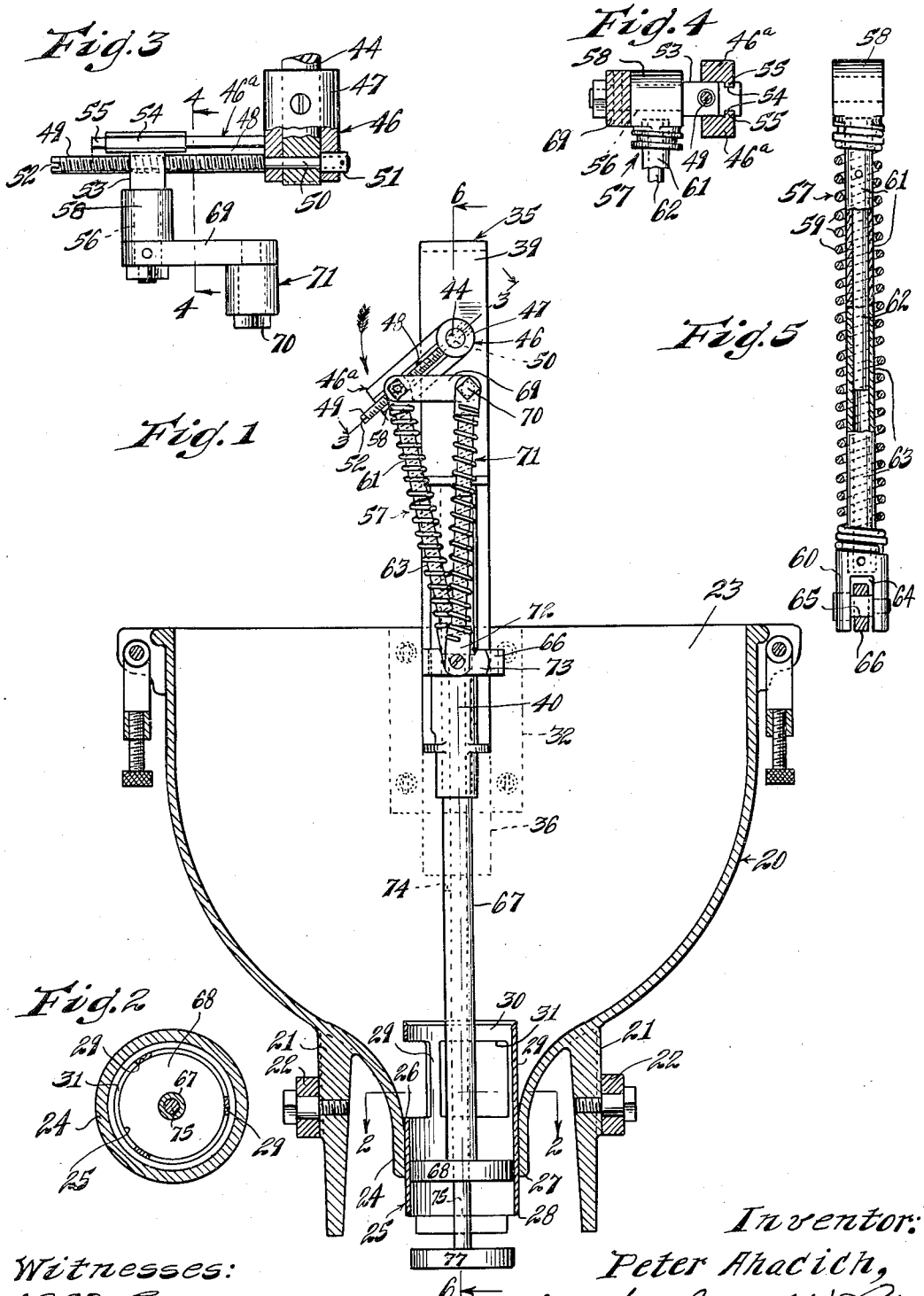
Witnesses:
C. E. Wessels
F. C. Appleton
Inventor:
Peter Ahacich,
By Joshua R H Potts
his Attorney.

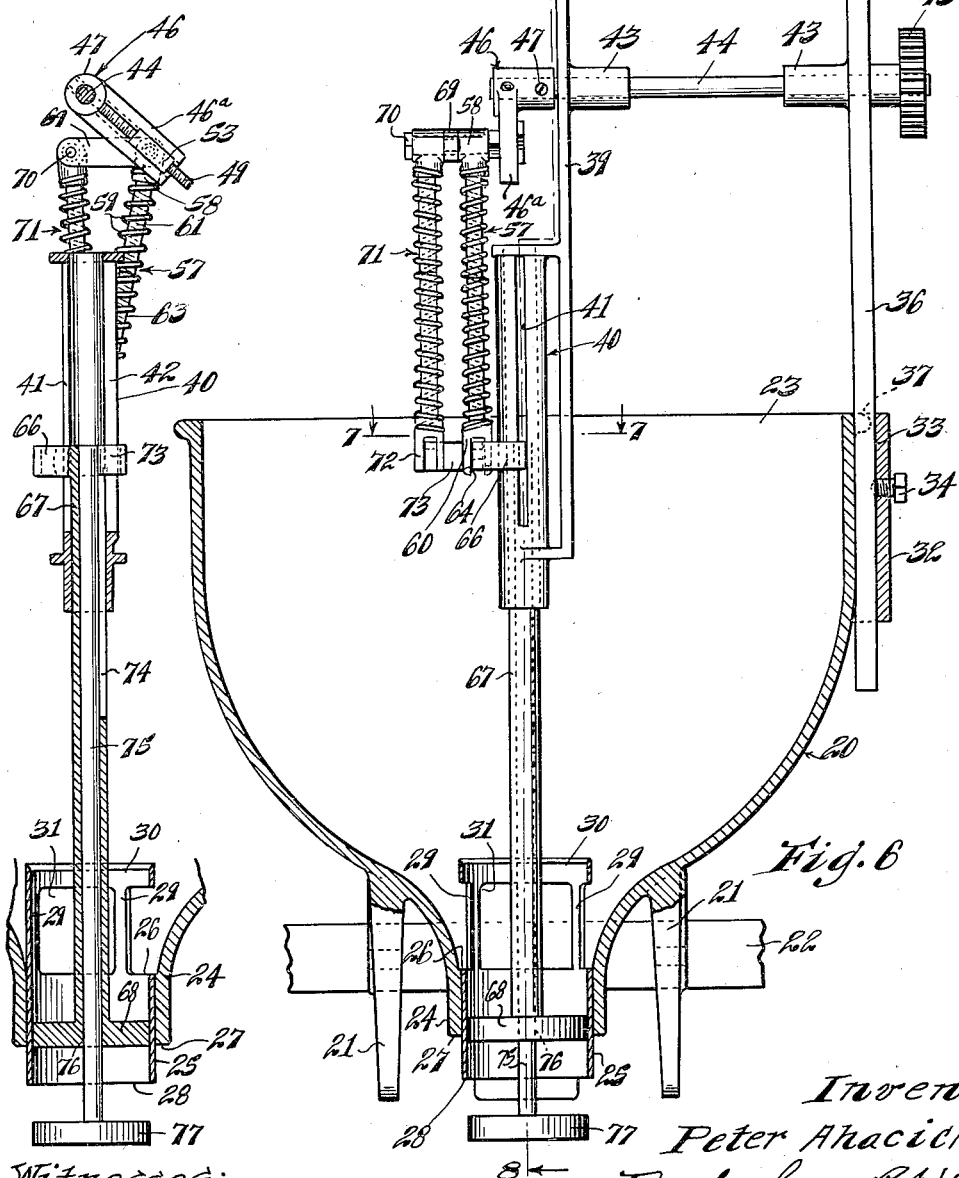

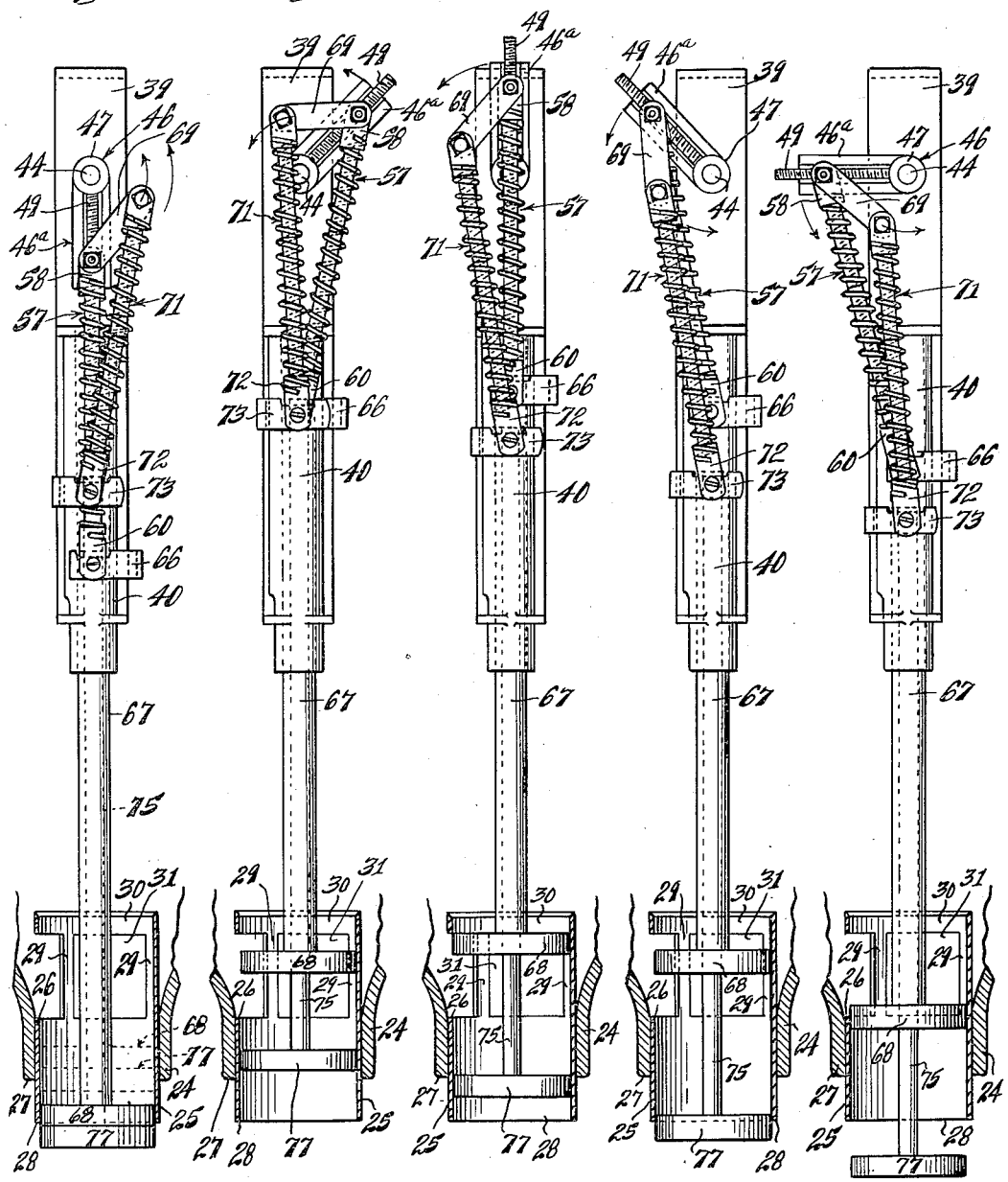

Patented Dec. 10, 1935

2,023,658

UNITED STATES PATENT OFFICE 2,023,658

DOUGHNUT MECHANISM AND THE LIKE

Peter Ahacich, Chicago, Ill.

Application December 2, 1931, Serial No. 578,483

1 Claim. (Cl. 107—14)

This invention relates to improvements in doughnut mechanism and the like, and more particularly to improved means for feeding doughnut material and the like and for forming doughnuts and such.

An object of the invention, among others, is the provision of new and improved mechanism for feeding doughnut material in varied quantities as desired to form doughnuts of various sizes.

Another object of said invention is to form such doughnuts so that all doughnuts of the desired size are similar and uniform in character and size and other respects. Another object is the provision of improved mechanism for operating the doughnut measuring, cutting, feeding, and forming mechanism.

Still another object is the provision of new and improved guiding means to cooperate with such mechanism.

The invention also has for an object the provision of mechanism for accomplishing the said results which will be simple of construction, easy of manufacture, and relatively inexpensive.

These and other objects and advantages of my invention will appear from the specification hereinafter set forth.

The invention will be best understood by reference to the accompanying drawings, forming a part of this specification, and in which:

Fig. 1 is a sectional elevational view of a preferred form of mechanism embodying the principle of my invention;

Fig. 2 is a section taken on the line 2—2 of Fig. 1;

Fig. 3 is a section taken on the line 3—3 of Fig. 1, illustrating details of the crank mechanism;

Fig. 4 is a section taken on the line 4—4 of Fig. 3, showing details of the crank mechanism;

Fig. 5 is an elevational view, partly in section, showing the yielding link employed in connection with the operating mechanism in the preferred form shown;

Fig. 6 is a view taken on the line 6—6 of Fig. 1, said view being at right angles to the view shown in Fig. 1;

Fig. 7 is a sectional view taken on the line 7—7 of Fig. 6;

Fig. 8 is a sectional view taken on the line 8—8 of Fig. 6, showing the condition and relation of the operating parts at one stage of the movement of the mechanism; and Figs. 9, 10, 11, 12, and 13 are sectional views, showing condition and relation of the operating parts at various other stages of the movement of the mechanism in one cycle of operation.

The preferred form of construction as illustrated in the drawings comprises a hopper 20 having legs 21 by means of which the hopper may be mounted upon supporting bars 22 in an obvious manner. The hopper 20, as shown in the preferred form of the drawings, is of the common type having an enlarged open bowl-like upper portion 23 and a cylindrical discharge neck portion 24. The neck portion 24 has fitted therein a bushing 25, the bushing extending from the upper end 26 of the neck portion to beyond the lower end 27 of the neck portion, terminating at 28, as shown in the drawings. Extending upwardly from the said bushing 25 are vertical bars 29 which are joined together at their upper ends by means of a circular band 30 corresponding in dimension to the bushing 25; in other words, the band and bars being aligned downwardly with the bushing and may be formed integrally therewith. The construction of the bars 29 manifestly forms openings 31 between each pair of bars. As will more fully appear hereinafter, the bars form guiding and centering means for the cutting and forming mechanism, and the apertures are so arranged as to permit the dough in the hopper to be fed therethrough into the cylindrical chamber at predetermined intervals.

Affixed to the hopper is a boss 32 having an opening 33. Extending vertically upwardly through the opening 33 and locked and supported in the said boss by means of a screw 34 is a bracket 35 having a leg 36 extending through a recess 37 in the marginal bead of the hopper. The bracket 35, which is the main supporting means for the operating mechanism hereinafter to be described, has a horizontal leg 38, and a vertical leg 39 extending downwardly and supporting a stationary guide sleeve 40 having vertical slots 41 and 42 formed therein. Supported in the legs 36 and 39 by means of bearings 43, is a driven shaft 44. The power means for this shaft is not shown in the drawings except that a pinion 45 is shown mounted upon one end of the driven shaft 44 which extends beyond the leg 36. By this means said driven shaft may obviously be coupled to a source of power such as a motor and driven thereby, or a manually operated handle may be attached to said shaft. The other end of said shaft 44 extends through the opposite leg 39, and affixed thereto is a crank 46, having an arm 46ᵃ. The crank and associated elements are shown in detail in Figs. 1, 3, and 4. The crank 46 has a hub 47, and the arm 46ᵃ is provided with a dovetail slot 48 which extends from the outer end of the arm to the driven shaft 44. Mounted centrally in the slot 48 is an adjusting screw 49, having a shank portion 50 which extends beyond the end of the slot 48 into an aperture in the hub 47, and extends further, through another aperture in the driven shaft 44. The shank extends still further into another aperture on the opposite side of the hub. In the last mentioned aperture the shank portion is provided with a sleeve or collar 51 which may be secured thereto in an obvious manner. By virtue of the collar or sleeve 51 the screw 49 is made longitudinally immovable but at the same time is permitted to rotate in a swivel manner.

The opposite end of the screw has formed therein a groove 52 adapted to receive a screw driver to operate the screw 49, but the same may be otherwise formed. Adapted to slide in the dovetail slot 48 is a block 53, the sides of which are grooved, as at 54, to conform to undercut walls 55 of the dovetail slot so that the block 53 may move back and forth in the slot. The block 53 has a threaded aperture in the central portion thereof adapted to receive therein the adjusting screw 49.

In the mechanism just described the same is arranged and constructed so that the adusting screw 49 may be operated by the engagement of a screw driver in the groove 52 at the end of the adjusting screw 49 to cause a swiveling movement of the screw, which movement will result in a movement in one of two directions of the block 53.

Block 53 has integrally formed therewith a shank 56. Pivotally mounted on the shank 56 is a yielding link 57, which link is shown in detail in Fig. 5. The element 57 comprises a head 58 having fixed thereto the upper end of a spring 59. The head 58 obviously has an eyelet by means of which the head 58 may be mounted upon the shank 56. The other end of the spring 59 is connected to a lower head 60.

Extending downwardly from the head 58 through the spring 59 is an upper sleeve 61. Internally fixed to the sleeve 61 is a rod 62 depending centrally through the sleeve 61 and beyond the lower end of the sleeve. Extending upwardly from the lower head 60, through the spring 59, is a lower sleeve 63, adapted to receive in its upper end that portion of the pin 62 which extends downwardly beyond the end of the sleeve 61. The member 57 is so constructed and arranged that by means of exerting force on the head 58 the member 57 may be extended against the tension of the spring 59, because of the fact that the sleeves 61 and 63 are not fastened together but are relatively movable. For example, when the member 57 is in extended condition the spring 59 will tend to retract the member 57 by exerting a reactive tensile force to draw the two sleeves back to their normal position. The rod 62 being at all times within the sleeve 63, at least to some extent of its length, will serve to guide the sleeve 63 in the contracting movement of the member 57. The purpose of this arrangement will be explained hereinafter more fully.

The head 60 is forked, as at 64, and extending through said fork 64 and pivotally mounted therein at 65 is one end of a U-shaped connecting member 66. The other end of said member 66 extends through slot 41 in the stationary guide sleeve 40 and is secured to a vertically reciprocating sleeve member 67, which reciprocates through the stationary guide sleeve 40. Fixed to the lower end of the sleeve 67 is a measuring, cutting, and feeding plunger 68. By means of the construction recited the sleeve 67 is adapted to reciprocate the plunger 68 through the bushing 25 which is secured in the cylindrical discharge neck portion 24, and also upwardly out of the bushing into the hopper 20, being guided by the members 29. Also fixedly mounted on the shank 56 is a supplemental crank arm 69. Secured to the opposite end thereof is a bolt 70, and pivoted on the bolt 70 in turn is a yielding link 71 which is similar in all respects to the yielding link 57 heretofore described. The yielding link 71 has a head 72 which is forked in the same way as the head 60 to receive one end of a U-shaped connecting member 73, the other end of which extends through slot 42 in the stationary guide sleeve 40, and thereafter extends further through a second slot 74 in the vertically reciprocating sleeve member 67. The connecting arm 73 is then secured to a vertically reciprocating rod 75 which operates within the sleeve 67. The rod 75 is constructed of such length as to enable it to extend downwardly through the sleeve 73 and through an aperture 76 provided in the plunger 68, the aperture 76 obviously being arranged to register with the interior of the sleeve 67. The rod 75 extends through the aperture 76 out of and beyond said plunger and is secured at its lowest extremity to a forming plunger 77.

In the operation of the mechanism hereinbefore described it will be understood that the driven shaft 44 may be linked up to a source of power. The adjusting screw 49 may then be turned by a screw driver or other obvious means, which will cause the block 53 to move nearer to or farther away from the driven shaft 44. Inasmuch as the shank portion 56 is integral therewith in the form used to illustrate the present invention, and inasmuch as the yielding link 57 is pivotally mounted on the shank 56, the relative position of the link will be altered in correspondence with the adjustment of the adjusting screw 49 in the dovetail slot 48. For example, if the adjusting screw is turned in one direction and the block 53 moved nearer the driven shaft 44, the radius of revolution of the shank portion 56 will be shortened, causing the yielding link 57 to be correspondingly changed, which in turn will cause a similar alteration in the vertically reciprocating sleeve member 67 and the measuring, cutting and feeding plunger 68 affixed to the lower end of the sleeve 67. The consequence of this will be that less doughnut material will be fed into the cylindrical discharge neck portion 24 with its bushing 25 to make a smaller doughnut. Thus the quantity of the material to be fed and the size of the doughnut may be controlled by simple adjustment of the adjusting screw member 49.

If the adjusting screw is swiveled in the opposite direction to move the block 53 away from shaft 44, the throw of the crank will be increased and the vertically reciprocating sleeve member 67 will be correspondingly changed in relation to the neck portion 24 and more dough will be permitted to feed into the said portion by the cutting plunger 68, as will be manifest to those skilled in the art. When the adjusting screw 49 has been properly adjusted, the motor or other power means may be operated to actuate the plungers. The plunger 68, as will appear from the drawings, will then be reciprocated in and out of the bushing 25, and when the plunger 68 is reciprocated upwardly out of the bushing it will be guided by the bars 29.

In the operation of the device it has been found that because of pressure or because of friction or obstruction caused by dough material, or other obstructions being introduced between the plungers or sticking to the wall of the bushing, especially when the plungers are moving at different speeds, interference is caused with the operation of the plungers. To overcome this difficulty and facilitate the operation of the mechanism with safety and a minimum of injury to the machine, I have provided the yielding links, which have proved particularly advantageous. For example, if the plunger should fail to operate because of resistance of one kind or another, or should operate improperly, in many cases it would be impossible to operate the machine without grave danger of causing injury to the mechanism, in the absence of the yielding links which I have provided. This danger is obviously eliminated by the yielding links, and it is believed that in most cases the continued operation of the machine in connection with the force exerted by the yielding links will be found to work out the obstruction automatically.

In Figs. 1, 9, 10, 11, 12, and 13, there has been shown the condition of the operating mechanism and the relation of the parts in the various portions of a cycle of the operation of the mechanism. For example, in Fig. 1 the plunger 68 is within the bushing 25 a slight distance above the terminus 28 of the bushing. At the same time the plunger 77 has been reciprocated downwardly out of the bushing to a point a short distance below the terminus 28. In the movement from the position shown in Fig. 1 to the position shown in Fig. 9 the plunger 68 has been moved downwardly and the plunger 77 has been moved upwardly and the two adjacent faces of the plungers have met substantially on the plane of the terminus 28 of the bushing. In case all the doughnut material has not been discharged from the forming plunger 77 the remainder will be discharged in the meeting of the plungers. In the downward reciprocation of the plunger 68 the same will serve to assist in feeding any dough remaining in the bushing 25 onto the plunger 77 to be discharged therefrom.

From the position shown in Fig. 9 both plungers move upwardly together a short distance, as will be apparent from the broken lines, until the plunger 77 reaches the limit of its upward travel, and the plunger 68 then continues on in its upward vertical movement out of the bushing 25 and upwardly between the vertical bars 29, as shown in Fig. 10.

In Fig. 11 it will be observed that plunger 77 has moved downwardly while plunger 68 continued its upward travel to the limit thereof, adjacent the circular band 30. In Fig. 10 as soon as the vertical plunger 68 has moved out of the bushing the doughnut material will be fed into the neck portion toward the plunger 77. In Fig. 11 when the plunger 77 has started its downward travel it may exert a suction force to assist in the feeding of the doughnut material. In Fig. 12 the plunger 68 has reversed its movement and is engaged in downward movement, just prior to performing its function of cutting the doughnut material to prevent any further material from being fed. The importance of the vertical bars 29 will be especially apparent from Fig. 12, where the plunger 68 is shown out of contact with the bushing 25, and the plunger 77 is shown to have been reciprocated out of the bushing also. The plunger might be moved laterally to cause imperfect operation if it were not for the provision of the guiding means which center the plungers for reciprocation through the bushing.

In Fig. 13 the plunger 68, which has moved at greater speed than the plunger 77, has cut the doughnut material and has moved into the bushing 25 to continue its assistance in feeding the doughnut material if necessary, the necessity depending on factors including the fluidity of the doughnut material. The plunger 77 has moved out from the lower end of the bushing 25 to permit the discharge of the doughnut material therefrom, either by gravity or the cooperation of the plunger 68, or both, as will be readily understood by those skilled in the art.

Following the position shown in Fig. 13, the plungers will be reciprocated to the position shown in Fig. 1 to repeat the same cycle of operation.

While I have illustrated and described the preferred form of construction for carrying my invention into effect, together with certain of its advantages, this is capable of variation and modification without departing from the spirit of the invention. I therefore, do not wish to be limited to the precise details of construction set forth, but desire to avail myself of such variations and modifications as come within the scope of the appended claim.

Having described my invention, what I claim as new and desire to secure by Letters Patent is:

In doughnut making mechanism or the like, a hopper, a shaft, a crank on said shaft, a pair of yielding links connected to said crank, a cutting and feeding plunger connected to one of said links and a forming and discharging plunger connected to the other of said links, said plungers cooperating with said hopper to cut, feed, form, and discharge doughnuts, and screw means for varying the connection between the yielding links and the crank.

PETER AHACICH.